UNITED STATES PATENT OFFICE.

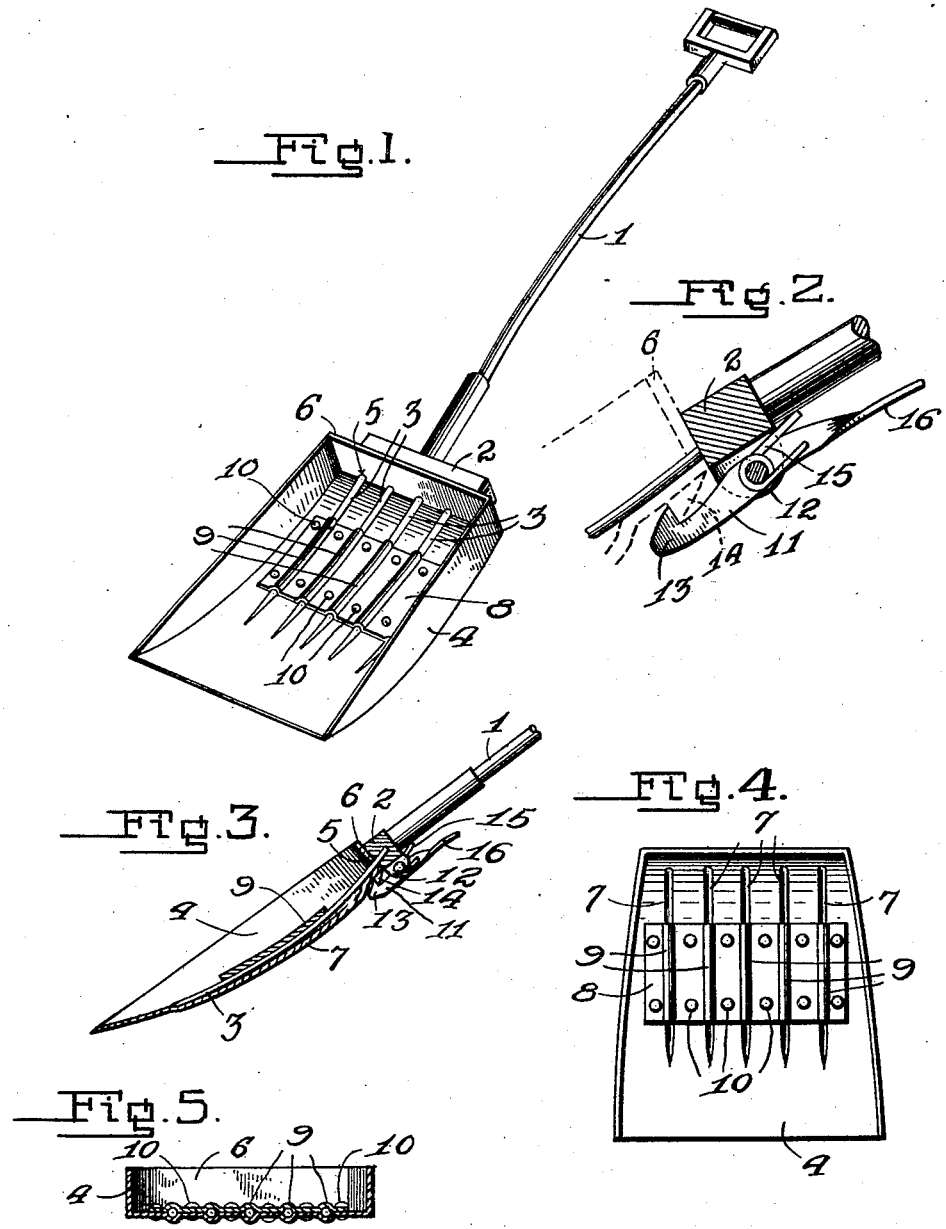

HENRY C. SUMERLIN, OF CRESTON, WASHINGTON.

COMBINATION FORK AND SHOVEL.

969,307.      Specification of Letters Patent.      Patented Sept. 6, 1910.

Application filed April 12, 1910. Serial No. 555,032.

*To all whom it may concern:*

Be it known that I, HENRY C. SUMERLIN, a citizen of the United States of America, residing at Creston, in the county of Lincoln and State of Washington, have invented certain new and useful Improvements in a Combination Fork and Shovel, of which the following is a specification, reference being had therein to the accompanying drawing.

This invention relates to forks used for agricultural purposes which are provided with a detachable shovel or scoop.

The invention has for its object to provide an improved device of this kind, by means of which a shovel or scoop may readily be detachably engaged with the tines and handle of the fork.

The invention further has for its object to simplify the construction of a device of this kind whereby the tines will be effectively engaged with the shovel and their points adequately protected.

The invention further has for its object to provide an improved device of this kind, by means of which the shovel may be quickly and readily attached to and detached from the fork.

Referring to the drawings, Figure 1 is a view in perspective of a fork with a shovel attached thereto and constructed in accordance with this invention. Fig. 2 is an enlarged detail view of a portion of the handle, fork and shovel, showing the means for securing the shovel to the handle. Fig. 3 is a detail view showing the shovel in longitudinal section and the means for attaching it to the fork and handle. Fig. 4 is a plan view of the shovel detached from the fork. Fig. 5 is a detail view showing the shovel in cross section.

In carrying out the invention, a fork having a handle, 1, and a fork secured thereto consisting of a cross bar, 2, provided with tines, 3, is shown. In order to detachably secure the shovel or scoop thereto, a shovel, 4, is formed with a number of holes, 5 in the upturned flange, 6, of its rear portion, through which are adapted to be passed the tines, 3, so as to extend longitudinally over the bottom of the shovel. In order that the tines may readily and firmly rest against the bottom of the shovel and be braced thereby, the bottom of the shovel is provided with longitudinal grooves, 7, in which the tines 3 are adapted to fit and be seated, the outer ends of the tines being so seated in the outer ends of said grooves as to be practically flush with the bottom of the shovel and thereby be protected from being caught by any material taken into the shovel, and prevented from being broken or twisted. In order to securely hold the tines against the bottom of the shovel, suitable clamping means are employed, and as here shown, preferably consisting of a plate, 8, extending across the bottom of the shovel and provided with grooved raised portions, 9, conforming in shape to the grooves 7 in the bottom of the shovel and forming therewith longitudinal sockets through which the tines 3 may be passed and held in place in the grooves 7. The plate 8 is secured to the bottom of the shovel by rivets 10, or other suitable fastening means. In order that the shovel may be readily attached to and detached from the fork and held thereon, a suitable locking device is employed, and as here shown, preferably consisting of a latch, 11, pivoted to a lug, 12, depending from the cross bar, 2, and provided at one end with a hook, 13, which engages a shoulder or catch, 14, on the under side of the shovel. The catch 11 is provided with a suitable spring 15, which serves to hold the hook 13 in engagement with head, 14, the catch 11 having a handle, 16, by means of which it may be swung to release the head 13 from the shoulder 14.

It will be seen that by means of this invention that the shovel may be readily attached to and removed from the fork, and will be securely held in engagement therewith; and the tines of the fork will be fully protected and out of the way from material taken up by the shovel.

Having described the invention, I claim:

1. A fork, and a shovel detachably secured thereto and having longitudinal grooves, the tines of said fork resting in said longitudinal grooves.

2. A fork, a shovel having longitudinal grooves in its bottom in which the tines of said fork rest, means for holding said tines in said groove, and means for detachably securing said shovel to said fork.

3. A fork, a shovel having longitudinal grooves in its bottom, a plate extending across the bottom of said shovel and secured thereto and having longitudinal grooves corresponding to the grooves in the shovel, the tines of said fork being located in said grooves in the shovel and extending through said grooves in the plate, and means for detachably securing said shovel to said fork.

4. In a device of the character described, a shovel having longitudinal grooves in its bottom having tapering outer ends, and a fork having its tines located in said grooves with the ends of the tines sunk within the outer ends of said grooves, and means for securing said shovel to said fork.

5. In a device of the character described, a shovel having its bottom formed with longitudinal grooves adapted to receive the tines of a fork, and means extending across the bottom of said shovel for holding said tines in said groove.

6. In a device of the character described, a shovel having a vertical flange at its rear end provided with a row of holes and having longitudinal grooves in its bottom communicating with said holes, a transverse plate secured to the bottom of the shovel and having longitudinal grooves corresponding with the grooves of the shovel, a locking lug on the underside of said shovel, a fork having its tines extending through said holes and grooves in the shovel, and a locking latch on the fork engaging the lug on the shovel.

In testimony whereof I hereunto affix my signature in presence of two witnesses.

HENRY C. SUMERLIN.

Witnesses:
WILLIAM H. WRIGHT,
W. H. HOWARD.